US008671251B2

(12) United States Patent
Higashi

(10) Patent No.: US 8,671,251 B2
(45) Date of Patent: Mar. 11, 2014

(54) INFORMATION PROCESSING APPARATUS THAT EXECUTES RESPONSE PROCESS TO RECEIVED INFORMATION, CONTROL METHOD THEREFOR, AND STORAGE MEDIUM STORING CONTROL PROGRAM THEREFOR

(75) Inventor: Hidenori Higashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 135 days.

(21) Appl. No.: 13/343,402

(22) Filed: Jan. 4, 2012

(65) Prior Publication Data

US 2012/0191926 A1 Jul. 26, 2012

(30) Foreign Application Priority Data

Jan. 26, 2011 (JP) ................. 2011-014042

(51) Int. Cl.
*G06F 13/00* (2006.01)
*G06F 12/00* (2006.01)
(52) U.S. Cl.
USPC ............... 711/154; 711/4; 711/100; 711/112; 711/113; 711/114; 711/143; 711/165
(58) Field of Classification Search
USPC ............. 711/4, 100, 112, 113, 114, 143, 154, 711/165
See application file for complete search history.

(56) References Cited

U.S. PATENT DOCUMENTS 6,516,426 B1 * 2/2003 Forehand et al. ............... 714/24
2009/0164816 A1 6/2009 Yasuda

FOREIGN PATENT DOCUMENTS

JP 2009151537 A 7/2009

* cited by examiner

*Primary Examiner* — Midys Rojas
(74) *Attorney, Agent, or Firm* — Fitzpatrick, Cella, Harper & Scinto

(57) ABSTRACT

An information processing apparatus that is capable of preventing the overwriting of an incoming packet without disconnecting the network connection. The information processing apparatus receives incoming information via a network, stores it into a storage area, and executes a response process thereto. A response processing unit executes the response process to the incoming information. A first change unit switches so that the incoming information is stored into a second storage area after the incoming information, which is a factor to shift to a power mode from a power saving mode, is stored into a first storage area. A second change unit switches so that the incoming information is stored into the first storage area after the response processing unit executes the response process to the incoming information stored in the first storage area.

18 Claims, 5 Drawing Sheets

INFORMATION PROCESSING APPARATUS THAT EXECUTES RESPONSE PROCESS TO RECEIVED INFORMATION, CONTROL METHOD THEREFOR, AND STORAGE MEDIUM STORING CONTROL PROGRAM THEREFOR

BACKGROUND OF THE INVENTION

1. Field of the Invention

The present invention relates to an information processing apparatus that receives information via a network and executes a response process to the received information concerned, a control method therefor, and a storage medium storing a control program therefor.

2. Description of the Related Art

In recent years, information processing apparatuses that are provided with a power saving mode have spread. For example, Japanese Laid-Open Patent Publication (Kokai) No. 2009-151537 (JP 2009-151537A) discloses an information processing apparatus that has a main control unit and a sub control unit, reduces (or cuts) power supply to the main control unit in the power saving mode than in a normal mode, and executes a network response by the sub control unit without recovering the power supply to the main control unit to the normal mode.

Incidentally, the apparatus disclosed in JP 2009-151537A uses the sub control unit to respond to an incoming packet that can be responded by the sub control unit without operating the main control unit in the power saving mode.

On the other hand, when an incoming packet cannot be responded by the sub control unit, the apparatus recovers the power supply to the main control unit to the normal mode (a normal power mode), and then, the main control unit executes the network response.

Then, when the main control unit returns to the normal power mode, the sub control unit passes the incoming packet that is difficult to respond by the sub control unit to the main control unit. Accordingly, the main control unit can respond to the incoming packet shortly after returning to the normal power mode without waiting for resending of a packet by a packet transmitting source.

In this case, the sub control unit must stop from writing an incoming packet to a receive buffer until the return to the normal power mode is completed so that the incoming packet passed to the main control unit may not be overwritten by a following incoming packet. Therefore, network connection (link) is once disconnected and is reestablished when the return to the normal power mode is performed.

As a result, since the main control unit cannot perform the network communication at all until the link is reestablished even after returning to the normal power mode, a network response is delayed.

SUMMARY OF THE INVENTION

The present invention provides an information processing apparatus, a control method therefor, and a storage medium storing a control program therefor, which are capable of preventing the overwriting of an incoming packet without disconnecting the network connection so that a network response is not delayed.

Accordingly, a first aspect of the present invention provides an information processing apparatus that receives incoming information via a network, stores the incoming information into a storage area, and executes a response process to the incoming information, comprising a response processing unit configured to execute the response process to the incoming information, a first change unit configured to switch so that the incoming information is stored into a second storage area after the incoming information, which is a factor to shift to a power mode in which the response processing unit can execute the response process from a power saving mode in which the response processing unit cannot execute the response process, is stored into a first storage area, and a second change unit configured to switch so that the incoming information is stored into the first storage area after the response processing unit executes the response process to the incoming information stored in the first storage area.

Accordingly, a second aspect of the present invention provides an information processing apparatus that receives incoming information via a network, stores the incoming information into a storage area, and executes a response process to the incoming information, comprising a response processing unit configured to execute the response process to the incoming information, and a storage control unit configured to store a newly incoming information into a second storage area after storing the incoming information, which is a factor to shift to a power mode in which the response processing unit can execute the response process from a power saving mode in which the response processing unit cannot execute the response process, into a first storage area, and to store a newly incoming information into the first storage area after the response processing unit executes a response process to the incoming information stored in the first storage area.

Accordingly, a third aspect of the present invention provides a control method for an information processing apparatus that receives incoming information via a network and executes a response process to the incoming information, the control method comprising a response step of executing the response process to the incoming information, a first change step of switching a memory storing an incoming information from a first memory to a second memory after the incoming information, which is a factor to shift to a power mode in which the response step can be executed from a power saving mode in which the response step cannot be executed, is stored into the first memory, and a second change step of switching the memory storing an incoming information from the second memory to the first memory after executing the response process to the incoming information stored in the first memory in the response step.

Accordingly, a fourth aspect of the present invention provides a non-transitory computer-readable storage medium storing a control program causing a computer to execute a control method for an information processing apparatus that receives incoming information via a network and executes a response process to the incoming information, the control method comprising a response step of executing the response process to the incoming information, a first change step of switching a memory storing an incoming information from a first memory to a second memory after the incoming information, which is a factor to shift to a power mode in which the computer can execute the response step from a power saving mode in which the computer cannot execute the response step, is stored into the first memory, and a second change step of switching the memory storing an incoming information from the second memory to the first memory after executing the response process to the incoming information stored in the first memory in the response step.

According to the present invention, the overwriting of an incoming packet is prevented without disconnecting the network connection, and the network response is not delayed.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings. Although an image forming apparatus will be described as one of information processing apparatuses in this embodiment, the present invention can be similarly applied to information processing apparatuses other than the image forming apparatus as long as the apparatuses can connect to a network and can switch between a normal power mode and a power saving mode.

Figure 1:
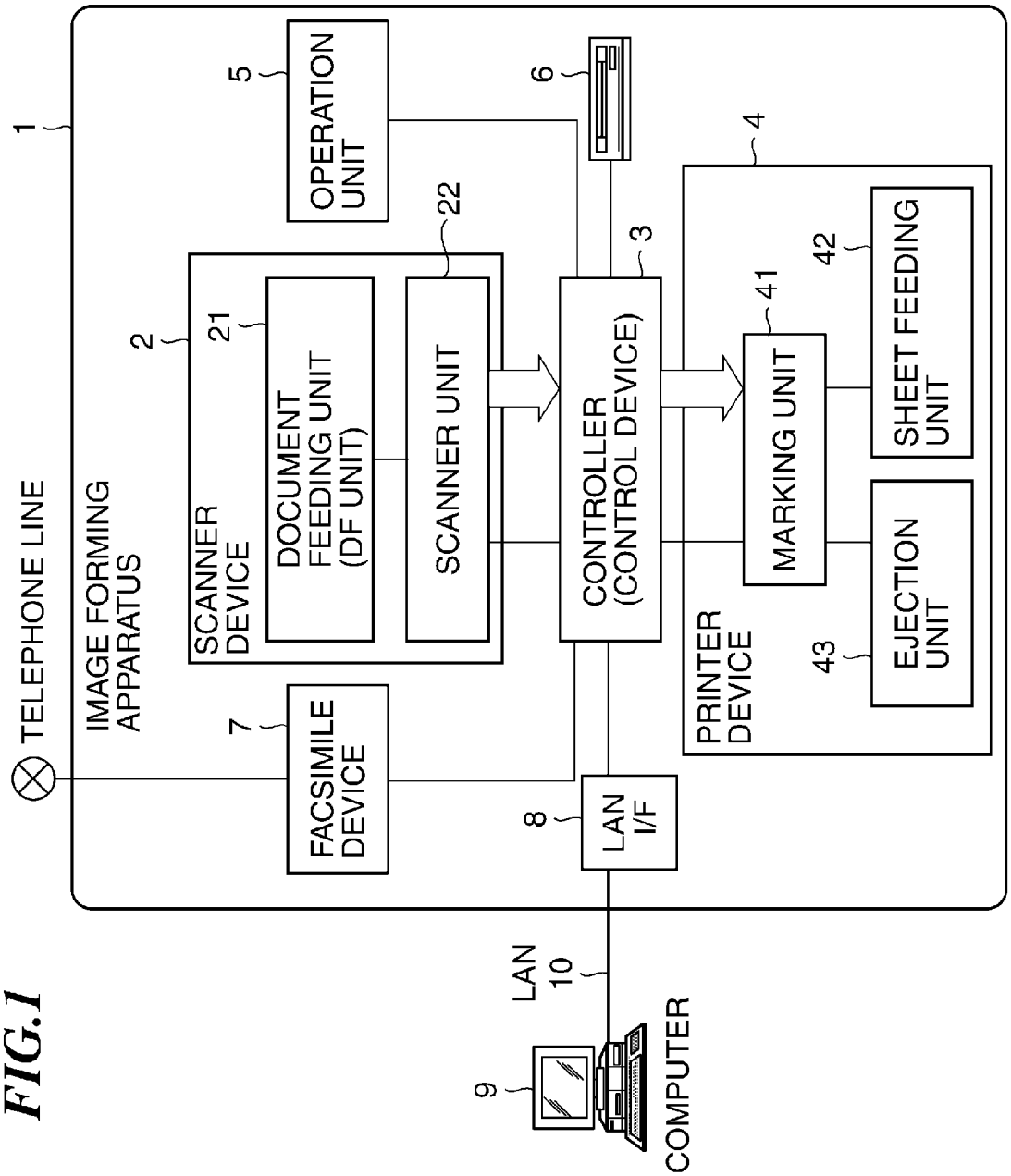
FIG. 1 is a block diagram showing an example of an image forming apparatus as an information processing apparatus according to an embodiment of the present invention.

FIG. 1 is a block diagram showing an example of the image forming apparatus as the information processing apparatus according to the embodiment of the present invention.

As shown in FIG. 1, the image forming apparatus 1 has a controller (a control unit) 3, a scanner device 2, and a printer device 4. An operation unit 5, auxiliary storage 6 like a hard disk drive unit, a facsimile device 7, and a network interface (a LAN I/F) 8 (an interface unit) are connected to the controller 3.

In the illustrated example, the LAN I/F 8 is connected to a computer (PC) 9 (an external apparatus) via a LAN 10, and the facsimile device 7 is connected to a telephone line. Although FIG. 1 shows the PC 9 only for convenience, a plurality of PC's are connected to the LAN 10 in fact.

As illustrated, the scanner device 2 has a document feeding unit (a DF unit) 21 and a scanner unit 22. An original bundle is set on the document feeding unit 21, and an original is sent to the scanner unit 22 from the document feeding unit 21. The scanner unit 22 scans an original optically and acquires an image signal. Then, the image signal is sent to the controller 3 from the scanner unit 22, and the controller 3 applies a predetermined image processing to the image signal to generate image data.

The printer device 4 has a marking unit 41, a sheet feeding unit 42, and an ejection unit 43. When an image is formed (printed), a recording sheet is sent to the marking unit 41 from the sheet feeding unit 42. The marking unit 41 prints an image on the recording sheet under control by the controller 3 according to the image data. Then, the recording sheet after printing is ejected to the outside of the image forming apparatus 1 through the ejection unit 43.

It should be noted that the operation unit 5 is used to receive various inputs to the controller 3 from a user and displays variety of information given from the controller 3. The auxiliary storage 6 stores image data, a control program that is executed by the controller 3, and the like. The illustrated image forming apparatus 1 prints an image based on the image data received from the PC 9 via the LAN 10.

Figure 2:
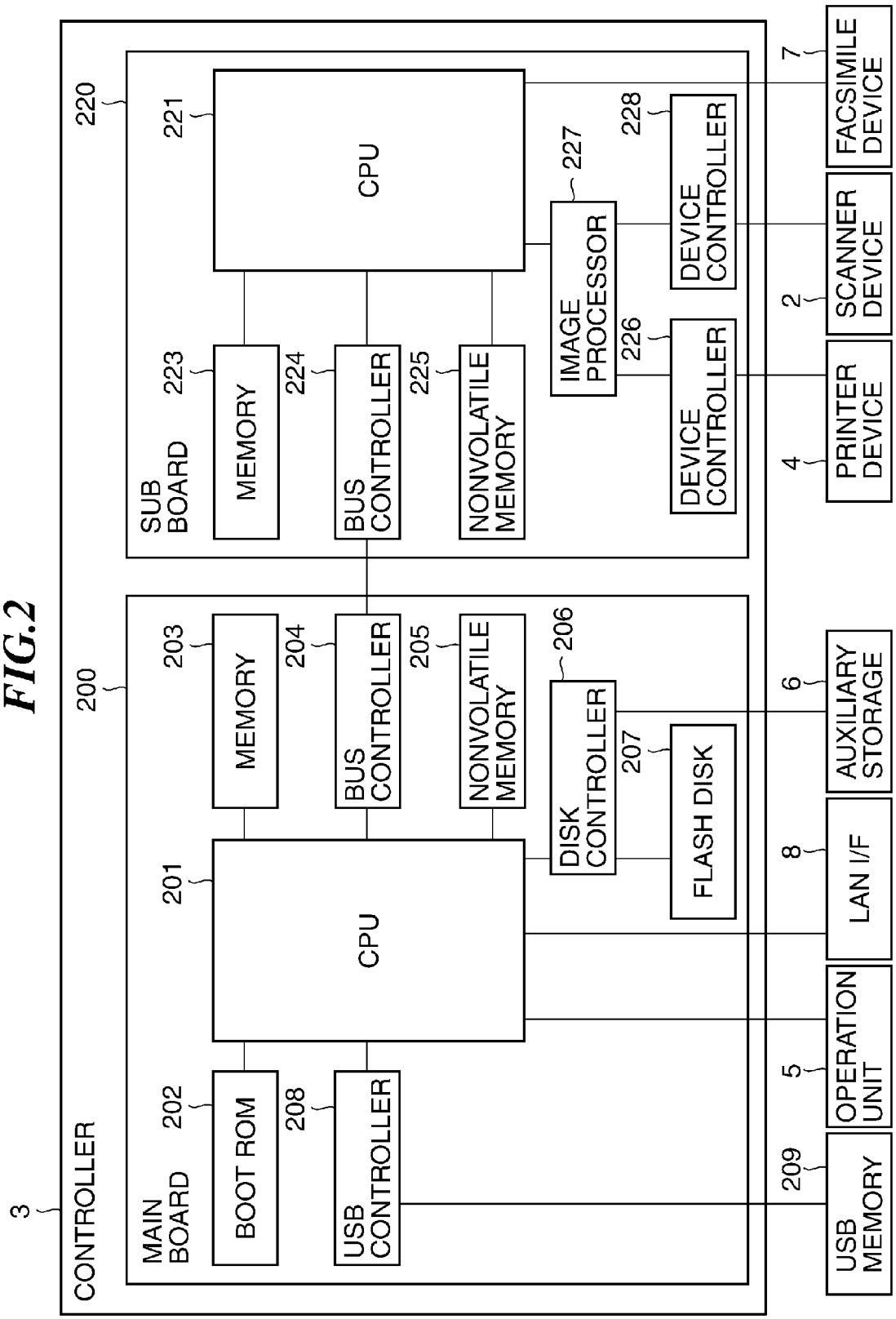
FIG. 2 is a block diagram showing an example of the configuration of the controller shown in FIG. 1.

FIG. 2 is a block diagram showing an example of the configuration of the controller 3 shown in FIG. 1.

As shown in FIG. 2, the controller 3 is provided with a main board 200 and a sub board 220. The main board 200 is a general-purpose CPU system.

The main board 200 has a CPU 201, and the CPU 201 manages the entire control of the main board 200. A boot ROM 202 stores a boot program. A memory 203 is used by the CPU 201 as a work memory. As illustrated, a bus controller 204, a nonvolatile memory 205, a disk controller 206, and a USB controller 208 are connected to the CPU 201. It should be noted that the operation unit 5 and the LAN I/F 8 are connected to the CPU 201.

The bus controller 204 has a bridge function with an external bus, and the CPU 201 is connected to the sub board 220 via the bus controller 204. The above-mentioned auxiliary storage 6 and a flash disk (SSD etc.) 207 that is a storage device of small capacity are connected to the disk controller 206. A USB memory 209 is connected to the USB controller 208 if needed.

The sub board 220 is constituted by a small-scale general-purpose CPU system and image processing hardware. The sub board 220 has a CPU 221, and the CPU 221 manages the entire control of the sub board 220. A memory 223 is used by the CPU 221 as a work memory. As illustrated, a bus controller 224, a nonvolatile memory 225, an image processor 227, and the above-mentioned facsimile device 7 are connected to the CPU 221.

The bus controller 224 has a bridge function with an external bus, and the CPU 221 is connected to the main board 200 via the bus controller 224. The image processor 227 for performing image processing is connected to the above-mentioned printer device 4 via the device controller 206 and to the scanner device 2 via the device controller 228.

It should be noted that FIG. 2 is simplified. For example, although the CPU 201 and the CPU 221 include peripheral hardware, such as a chip set, a bus bridge, a clock generator, they are omitted for the convenience of description of this embodiment.

Next, an operation of the controller 3 at the time of copying an image of an original onto a recording sheet will be described.

When a user instructs to copy an image from the operation unit 5, the CPU 201 sends an image copy instruction to the CPU 221 via the bus controllers 204 and 224. This makes the CPU 221 give an image reading command to the scanner device 2 via the image processor 227 and the device controller 228.

In response to the image reading command, the scanner device 2 scans an original optically and sends an image signal acquired by scanning to the image processor 227 via the device controller 228. Then, the image processor 227 performs a predetermined image processing to convert the image signal into the image data, and transfers the image data by the DMA system to the memory 223 via the CPU 221. This temporarily stores the image data into the memory 223.

When confirming that predetermined quantity of image data has been recorded in the memory 223 or the whole of image data has been recorded, the CPU 201 sends an image output instruction to the CPU 221. This makes the CPU 221 give an image output command to the printer device 4 via the image processor 227 and the device controller 226.

In this case, the CPU 221 instructs the position of the image data in the memory 223 to the image processor 227. Then, the CPU 221 transmits the image data in the memory 223 to the printer device 4 via the image processor 227 and the device controller 226 according to a synchronized signal sent from the printer device 4. As a result, the printer device 4 prints an image on a recording sheet based on the image data.

It should be noted that the CPU 201 saves the image data in the memory 223 to the auxiliary storage 6 when printing a plurality of copies. Then, the CPU 201 reads the image data from the auxiliary storage 6 and sends the image data concerned to the printer 4 when printing second and later copies.

Incidentally, the image forming apparatus 1 shown in FIG. 1 switches a state between a power saving mode and a normal power mode. In the normal power mode, electric power is supplied to both of the controller 3 and the LAN I/F 8 at least. In the normal power mode, the controller 3 can execute a responding process to an incoming packet. On the other hand, in the power saving mode, the power supply to the controller 3 is reduced rather than in the normal power mode at least. Therefore, the power consumption of the image processing apparatus 100 decreases. That is, the power consumption in the power saving mode is reduced rather than in the normal power mode. In the power saving mode, the controller 3 is in a power saving state where it cannot execute the responding process to an incoming packet.

Figure 3:
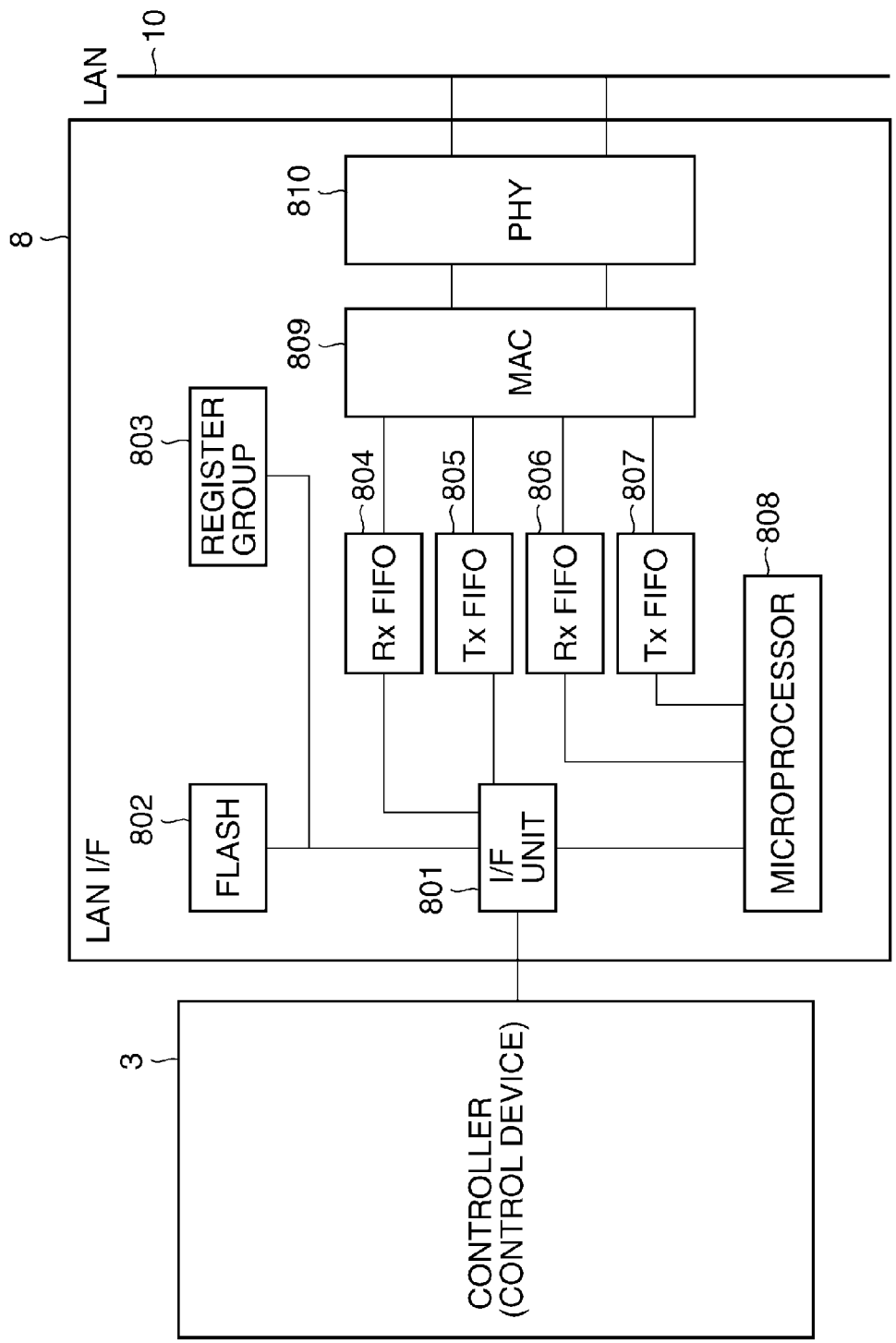
FIG. 3 is a block diagram showing a configuration of the LAN I/F shown in FIG. 1 and FIG. 2.

FIG. 3 is a block diagram showing a configuration of the LAN I/F 8 shown in FIG. 1 and FIG. 2.

As shown in FIG. 3, the LAN I/F 8 is connected to the controller 3 (i.e., the CPU 201) via the I/F unit 801. In the normal power mode, when receiving an incoming packet (receipt information) from the LAN 10, a media access control unit (MAC) 809 receives the incoming packet from LAN10 via a physical layer unit (PHY) 810. The MAC 809 sets the incoming packet to an FIFO receiving memory (Rx FIFO) 804. Then, the incoming packet set to the Rx FIFO 804 is sent to the controller 3 via the I/F unit 801.

In the normal power mode, when transmitting an outgoing packet or a response packet to the LAN 10, the outgoing packet or the response packet is set to an FIFO transmitting memory (Tx FIFO) 805 from the controller 3 via the I/F unit 801. The MAC 809 passes the outgoing packet or the response packet to a PHY 810 from the Tx FIFO 805, and sends the outgoing packet or the response packet concerned to the LAN 10.

In the power saving mode, the MAC 809 receives an incoming packet from the LAN 10 via the PHY 810. The MAC 809 sets the incoming packet concerned to the Rx FIFO 806 (a third storage area). Then, a microprocessor 808 determines whether a response to the incoming packet concerned is possible while keeping the power saving mode.

When determining that the response is possible while keeping the power saving mode, the microprocessor 808 generates a response packet (response information) corresponding to the incoming packet, and sets the response packet concerned to the Tx FIFO 807. The response packet (response information) set in the Tx FIFO 807 is sent to the LAN 10 by the MAC 809 via the PHY 810.

On the other hand, when determining that the response is impossible while keeping the power saving mode, the microprocessor 808 changes the state to the normal power mode from the power saving mode as mentioned later. This enables the hardware resources of the controller 3 to respond to the incoming packet.

A flash memory (Flash) 802 is a nonvolatile memory, and exchanges information with the controller 3 via the I/F unit 801. The controller 3 stores the information into the Flash 802 in order to notify the information to the microprocessor 808. A register group (Registers) 803 reflects statuses of the controls of the LAN I/F 8. The microprocessor 808 changes values stored in the register group 803 in order to change the setting of the MAC 809.

Figure 4:
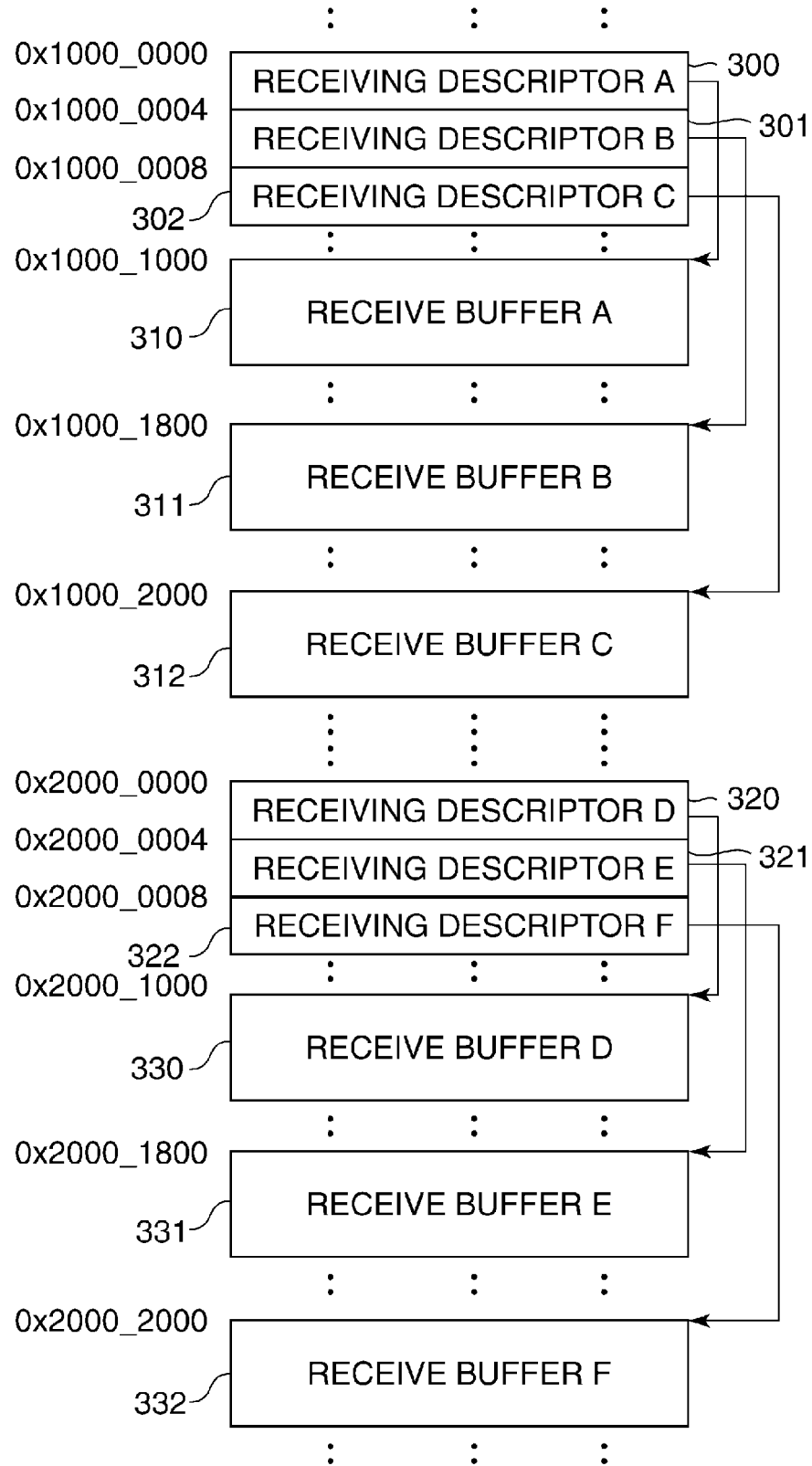
FIG. 4 is a view showing examples of receiving descriptors and receiving buffers that are arranged in a memory of the image forming apparatus shown in FIG. 1.

The main board 200 is equipped with a plurality of receive buffers (not shown in FIG. 2). For example, these receive buffers are arranged in the memory 203. FIG. 4 is a view showing examples of the receiving descriptors and the receive buffers arranged in the memory 203 shown in FIG. 2.

In this example, the receiving descriptor A 300 is mapped to the address "0x1000_0000" in the memory 203, the receiving descriptor B 301 is mapped to the address "0x1000_0004", the receiving descriptor C 302 is mapped to the address "0x1000_0008", the receiving descriptor D 320 is mapped to the address "0x2000_0000", the receiving descriptor E 321 is mapped to the address "0x2000_0004", and the receiving descriptor F 322 is mapped to the address "0x2000_0008".

In FIG. 4, the address "0x1000_1000" corresponding to the receive buffer A 310 is stored in the receiving descriptor A 300. The address "0x1000_1800" corresponding to the receive buffer B 311 is stored in the receiving descriptor B 301. The address "0x1000_2000" corresponding to the receive buffer C 312 is stored in the receiving descriptor C 302.

The address "0x2000_1000" corresponding to the receive buffer D 330 is stored in the receiving descriptor D 320. The address "0x2000_1800" corresponding to the receive buffer E 331 is stored in the receiving descriptor E 321. The address "0x2000_2000" corresponding to the receive buffer F 332 is stored in the receiving descriptor F 322.

In the example shown in FIG. 4, the receive buffer A 310, the receive buffer B 311, and the receive buffer C 312 are used as a first storage area that stores the receipt information. The receive buffer D 330, the receive buffer E 331, and the receive buffer F 332 are used as a second storage area that stores the receipt information. Although this example describes the case where three receive buffers are arranged as one set, each set has only to include at least one receive buffer.

The receiving descriptors are associated with the receive buffers, respectively. Each of the receiving descriptors functions as the first or second address storage area that stores the address of the associated receive buffer in the memory.

The receiving descriptor D 320, the receiving descriptor E 321, the receiving descriptor F 322, the receive buffer D 330, the receive buffer E 331, and the receive buffer F 332 are used only when returning to the normal power mode from the power saving mode.

On the other hand, the receiving descriptor A 300, the receiving descriptor B 301, the receiving descriptor C 302, the receive buffer A 310, the receive buffer B 311, and the receive buffer C 312 are used in the normal power mode.

Figure 5:
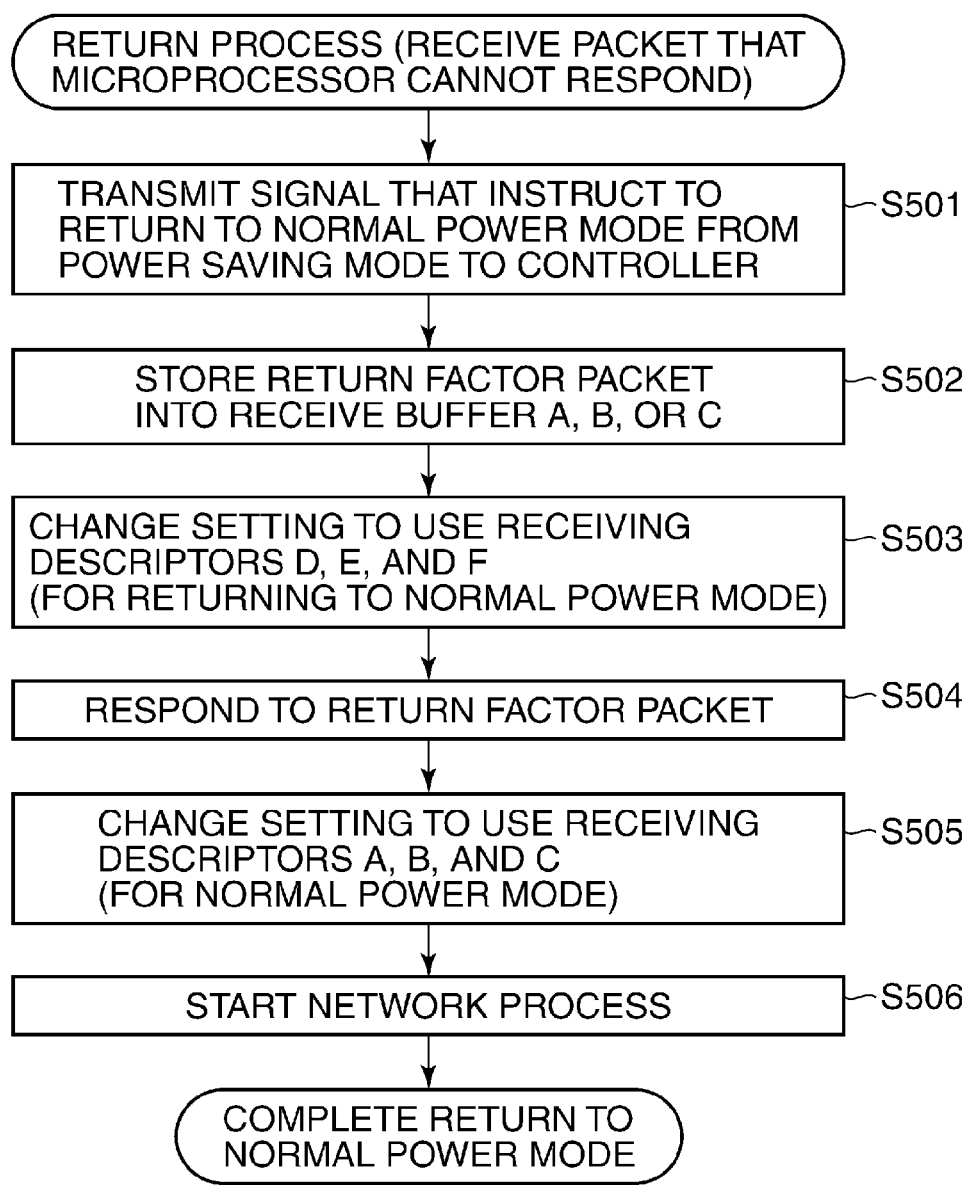
FIG. 5 is a flowchart showing a return process to the normal power mode from the power saving mode in the image forming apparatus shown in FIG. 1.

FIG. 5 is a flowchart showing a return process to the normal power mode from the power saving mode in the image forming apparatus 1 in FIG. 1.

When the LAN I/F 8 receives the incoming packet that is impossible to respond (i.e., a return factor packet) from the LAN 10, the microprocessor 808 transmits a signal that instructs to return to the normal power mode from the power saving mode to the controller 3 (step S501). This shifts the state of the controller 3 to the normal power mode from the power saving mode. Then, the microprocessor 808 stores the return factor packet into the receive buffer A 310, the receive buffer B 311, or the receive buffer C 312 (i.e., the first storage area) (step S502). In this case, the microprocessor 808 stores the address of the receive buffer into which the return factor packet is stored into the receiving descriptor corresponding to the receive buffer concerned.

It should be noted that no address is stored in the receiving descriptor corresponding to the receive buffer into which the return factor packet is not stored.

Then, the microprocessor 808 changes the setting of the MAC 809 so as to use the receiving descriptor D 320, the receiving descriptor E 321, and the receiving descriptor F 322 (step S503). That is, in the return process, an incoming packet is written into the receive buffer D 330, the receive buffer E 331, or the receive buffer F 332 (i.e., the second storage area) (the receiving descriptors are changed). That is, the MAC 809 controls the I/F unit 801 to store an incoming packet into the receive buffer D 330, the receive buffer E 331, or the receive buffer F 332. In this case, the MAC 809 stores the address of the receive buffer into which the incoming packet is stored into the receiving descriptor corresponding to the receive buffer concerned.

Next, in the return process, the CPU 201 refers to the receiving descriptors in the memory 203 to check the locations of the receive buffer A 310, the receive buffer B 311, and the receive buffer C 312 in the memory 203, generates a response packet (response information) to the return factor packet stored in the receive buffer A 310, the receive buffer B 311, or the receive buffer C 312, and sends this response packet to the LAN 10 via the LAN I/F 8 (step S504).

When the response to the return factor packet is completed, the CPU 201 performs the process to switch the receiving descriptors so as to use the receiving descriptor A 300, the receiving descriptor B 301, and the receiving descriptor C 302 (step S505). At this time, the CPU 201 instructs the microprocessor 808 to switch the receiving descriptors so as to use the receiving descriptor A 300, the receiving descriptor B 301, and the receiving descriptor C 302. The microprocessor 808 changes the setting of the MAC 809 to switch the receiving descriptors so as to use the receiving descriptor A 300, the receiving descriptor B 301, and the receiving descriptor C 302. After that, an incoming packet is written into the receive buffer A 310, the receive buffer B 311, or the receive buffer C 312. Then, the CPU 201 starts a usual network process (step S506). This completes the return to the normal power mode.

Thus, when changing to the normal power mode from the power saving mode, the return factor packet is stored into the receive buffer used in the normal power mode, and then, the receive buffer is switched to that used for returning. After responding to the return factor packet, the receive buffer is switched to that used by in the normal power mode. Accordingly, when an incoming packet is received during returning, an incoming packet is stored into the receive buffer for returning.

Therefore, even if an incoming packet is received in the course of the return process, the incoming packet concerned is stored into the receive buffer D 330, the receive buffer E 331, or the receive buffer F 332. If the incoming packet is stored in the receive buffer D 330, the receive buffer E 331, or the receive buffer F 332, the CPU 201 also processes the incoming packet concerned.

As a result, the return factor packet stored in the receive buffer A 310, the receive buffer B 311, or the receive buffer C 312 is not lost. Therefore, the CPU 201 can respond immediately to the return factor packet stored in the receive buffer A 310, the receive buffer B 311, or the receive buffer C 312.

Since it is unnecessary to perform an unlinking process and a linking process, the response to the return factor packet is not delayed.

According to this embodiment, when returning to the normal power mode from the power saving mode, a response can be ensured to a return factor packet without performing the unlinking process and the linking process, and its consistency can be kept because an incoming packet is not lost.

It became evident that the CPU 201 functions as a response processing unit and a second change unit in FIG. 2 and FIG. 3. The microprocessor 808 functions as a first change unit and a storing control unit.

Although the embodiments of the invention have been described, the present invention is not limited to the above-mentioned embodiments, the present invention includes various modifications as long as the concept of the invention is not deviated.

For example, an information processing apparatus may execute a control method that is defined by the functions of the above-mentioned embodiments. Further, the computer with which the information processing apparatus is provided may execute a control program that has the functions of the above-mentioned embodiments.

In this case, each of the control method and the control program has a first control step, a second control step, a first change step, and a second change step at least. It should be noted that the control program is recorded into a computer-readable storage medium, for example.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-014042, filed on Jan. 26, 2011, which is hereby incorporated by reference herein in its entirety.

What is claimed is:

1. An information processing apparatus that receives incoming information via a network, stores the incoming information into a storage area, and executes a response process to the incoming information, comprising:

a response processing unit configured to execute the response process to the incoming information;

a storage control unit configured to store, into a first storage area, first incoming information which causes said response processing unit to be shifted from a power saving mode in which said response processing unit cannot execute the response process to the first incoming information to a power mode in which said response processing unit can execute the response process to the first incoming information, wherein said response processing unit is configured to execute the response process to the first incoming information stored in the first storage area;

a first change unit configured to switch so that second incoming information is stored into a second storage area after the first incoming information is stored into the first storage area; and a second change unit configured to switch so that third incoming information is stored into the first storage area after said response processing unit executes the response process to the first incoming information stored in the first storage area.

2. The information processing apparatus according to claim 1, further comprising a memory configured to include the first and second storage areas, wherein said memory is further configured to include a first address storage area that stores a first address in said memory associated with the first storage area and a second address storage area that stores a second address in said memory associated with the second storage area, wherein said first change unit is controlled so that the second address of the second storage area in said memory is stored into the second address storage area, and wherein said second change unit is controlled so that the first address of the first storage area in said memory is stored into the first address storage area.

3. The information processing apparatus according to claim 2, wherein said response processing unit is configured to refer to the first address stored in the first address storage area and execute the response process to the first incoming information stored at the first address.

4. The information processing apparatus according to claim 2, wherein said first change unit is configured to switch an address storage area storing an address at which the second incoming information is stored from the first address storage area to the second address storage area, and wherein said second change unit is configured to switch an address storage area storing an address at which the third incoming information is stored from the second address storage area to the first address storage area.

5. The information processing apparatus according to claim 1, further comprising:

an interface unit configured to receive the first, second and third incoming information via the network; and a control unit configured to connect to said interface unit and include said response processing unit and a memory.

6. The information processing apparatus according to claim 5, wherein said interface unit is provided with a third storage area that temporally stores the first, second and third incoming information in the power saving mode.

7. The information processing apparatus according to claim 5, wherein said interface unit is configured to cause said control unit to shift from the power saving mode to the power mode if receiving the first incoming information.

8. The information processing apparatus according to claim 1, wherein electric power is supplied to said response processing unit in the power mode, and the electric power to be supplied to said response processing unit is reduced in the power saving mode.

9. The information processing apparatus according to claim 1, wherein the response process generates response information to the first incoming information.

10. The information processing apparatus according to claim 1, wherein the first storage area is a set of receive buffers and the second storage area is another set of receive buffers.

11. An information processing apparatus that receives incoming information via a network, stores the incoming information into a storage area, and executes a response process to the incoming information, comprising:

a response processing unit configured to execute the response process to first incoming information after said response processing unit is shifted from a power saving mode in which said response processing unit cannot execute the response process to the first incoming information to a power mode in which said response processing unit can execute the response process to the first incoming information; and a storage control unit configured to store the first incoming information into a first storage area, to store second incoming information into a second storage area after storing the first incoming information into the first storage area, and to store third incoming information into the first storage area after said response processing unit executes the response process to the first incoming information stored in the first storage area.

12. The information processing apparatus according to claim 11, further comprising:

an interface unit configured to receive the first, second and third incoming information via the network; and a control unit configured to connect to said interface unit and include said response processing unit.

13. The information processing apparatus according to claim 12, wherein said interface unit is configured to cause said control unit to shift from the power saving mode to the power mode if receiving the first incoming information.

14. The information processing apparatus according to claim 11, wherein electric power is supplied to said response processing unit in the power mode, and the electric power to be supplied to said response processing unit is reduced in the power saving mode.

15. The information processing apparatus according to claim 11, wherein the response process generates response information to the first incoming information.

16. The information processing apparatus according to claim 11, wherein the first storage area is a set of receive buffers and the second storage area is another set of receive buffers.

17. A control method for an information processing apparatus that receives incoming information via a network and executes a response process to the incoming information, the control method comprising:

a response step of a response processing unit executing the response process to the incoming information;

a storage control step of storing, into a first storage area, first incoming information which causes said response processing unit to be shifted from a power saving mode in which said response processing unit cannot execute the response process to the first incoming information to a power mode in which said response processing unit can execute the response process to the first incoming information, wherein said response processing unit is configured to execute the response process to the first incoming information stored in the first storage area;

a first change step of switching so that second incoming information is stored in a second storage area after the first incoming information is stored into the first area; and a second change step of switching so that third incoming information is stored in the first storage area after the response processing unit executes the response process to the first incoming information stored in the first storage area.

18. A non-transitory computer-readable storage medium storing a control program causing a computer to execute a control method for an information processing apparatus that receives incoming information via a network and executes a response process to the incoming information, the control method comprising:
- a response step of causing a response processing unit to execute the response process to the incoming information;
- a storage control step of storing, into a first storage area, first incoming information which causes said response processing unit to be shifted from a power saving mode in which said response processing unit cannot execute the response process to the first incoming information to a power mode in which said response processing unit can execute the response process to the first incoming information, wherein said response processing unit is configured to execute the response process to the first incoming information stored in the first storage area;
- a first change step of switching so that second incoming information is stored into a second storage area after the first incoming information is stored into the first storage area; and
- a second change step of switching so that third incoming information is stored in the first storage area after the response processing unit executes the response process to the first incoming information stored in the first storage area.

* * * * *